(12) United States Patent
Groeneweg et al.

(10) Patent No.: US 12,742,298 B2
(45) **Date of Patent: *Sep. 22, 2026**

(54) TOWABLE CRASH-ATTENUATING VEHICLE

(71) Applicant: Concaten, Inc., Golden, CO (US)

(72) Inventors: Kevin K. Groeneweg, Golden, CO (US); Taylor Groeneweg, Golden, CO (US); Connor Groeneweg, Golden, CO (US)

(73) Assignee: Concaten, Inc., Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/766,497

(22) Filed: Jul. 8, 2024

(65) Prior Publication Data

US 2024/0368850 A1 Nov. 7, 2024

Related U.S. Application Data

(63) Continuation of application No. 18/070,316, filed on Nov. 28, 2022, now Pat. No. 12,031,282.

(51) Int. Cl.
*E01F 15/14* (2006.01)
*B60Q 9/00* (2006.01)
(Continued)

(52) U.S. Cl.
CPC ............ *E01F 15/148* (2013.01); *B60Q 9/008* (2013.01); *B60R 19/18* (2013.01); *B60T 1/005* (2013.01);
(Continued)

(58) Field of Classification Search
CPC ....... B60R 19/40; B60R 19/56; B60R 19/565; B60R 19/18; B60R 2019/005;
(Continued)

(56) References Cited

U.S. PATENT DOCUMENTS 5,494,315 A * 2/1996 Heltenburg ............ B62D 33/02
280/759
5,797,614 A * 8/1998 Hord ...................... B62D 63/08
280/455.1

(Continued)

FOREIGN PATENT DOCUMENTS

KR 101876301 B1 7/2018

OTHER PUBLICATIONS

Translation of KR101876301.
International Search Report and Written Opinion of the ISA in co-pending case PCT/US20/32223.

*Primary Examiner* — Gregory A Blankenship
(74) *Attorney, Agent, or Firm* — Carl A. Hjort, III

(57) ABSTRACT

A towable crash-attenuating vehicle is shown having a frame; at least two axles coupled to the frame, each of the axles having wheels attached thereto; a ballast coupled to the frame; deflection shields coupled to the right and left sides of the frame, wherein the deflection shields cover the frame and a majority of the wheels on each side of the vehicle; a tow connection coupled to the front of the frame; an impact attenuator coupled to the rear of the frame; wherein the vehicle is provided with a brake system, and wherein the vehicle is provided with an mechanism for locking and unlocking the brake system.

20 Claims, 10 Drawing Sheets

(51) Int. Cl.

| | |
|---|---|
| ***B60R 19/18*** | (2006.01) |
| ***B60R 19/56*** | (2006.01) |
| ***B60T 1/00*** | (2006.01) |
| ***B60T 11/28*** | (2006.01) |
| ***B60T 13/04*** | (2006.01) |
| ***B60T 17/02*** | (2006.01) |
| ***B60T 17/08*** | (2006.01) |
| ***B62D 63/08*** | (2006.01) |
| ***E01F 9/692*** | (2016.01) |
| *B60D 1/54* | (2006.01) |
| *B60R 16/033* | (2006.01) |
| *B60R 19/00* | (2006.01) |

(52) U.S. Cl.

CPC ............... *B60T 11/28* (2013.01); *B60T 13/04* (2013.01); *B60T 17/02* (2013.01); *B60T 17/08* (2013.01); *B62D 63/08* (2013.01); *E01F 9/692* (2016.02); *B60D 2001/544* (2013.01); *B60R 16/033* (2013.01); *B60R 2019/005* (2013.01); *B60R 19/565* (2013.01)

(58) Field of Classification Search

CPC ......... E01F 15/10; E01F 15/14; E01F 15/148; B60B 39/00; B60T 11/00

USPC ... 296/187.02, 39.2, 24.4, 183.1, 37.5, 37.6; 280/491.3

See application file for complete search history.

(56) References Cited

U.S. PATENT DOCUMENTS 5,803,531 A * 9/1998 Nielsen .................. B60R 13/01 105/422
6,027,139 A * 2/2000 Malinowski, Jr. ...... B60R 13/01 280/759
6,079,741 A * 6/2000 Maver ............... B62D 49/0628 224/404
6,942,263 B2 * 9/2005 Welch .................. E01F 15/148 293/133
7,252,022 B1 * 8/2007 Losee .................. B25B 13/102 81/124.5
7,441,817 B1 10/2008 Unrath
7,572,022 B2 8/2009 Groeneweg
7,901,117 B2 3/2011 Groeneweg
8,322,945 B2 12/2012 Groeneweg et al.
8,465,047 B2 6/2013 Groeneweg
8,628,110 B2 1/2014 Groeneweg
8,657,336 B1 * 2/2014 Atra ....................... B60R 19/56 280/157
8,657,525 B2 2/2014 Groeneweg et al.
8,740,241 B2 6/2014 Groeneweg
8,777,255 B2 7/2014 Groeneweg
8,845,229 B2 9/2014 Groeneweg et al.
9,267,250 B2 2/2016 Groeneweg
9,273,437 B2 3/2016 Groeneweg et al.
9,394,657 B2 * 7/2016 Groeneweg ............ E01F 9/662
9,481,969 B2 11/2016 Groeneweg et al.
9,725,858 B2 8/2017 Groeneweg
9,732,482 B2 8/2017 Groeneweg
10,179,981 B2 1/2019 Groeneweg et al.
10,240,308 B2 * 3/2019 Groeneweg ............ E01F 15/00
10,301,787 B2 5/2019 Groeneweg
10,319,227 B2 * 6/2019 Roy .................... G08G 1/0955
10,428,474 B2 10/2019 Groeneweg
D871,268 S * 12/2019 Groeneweg ................. D12/106
10,669,681 B2 6/2020 Groeneweg et al.
10,899,287 B1 * 1/2021 Conley .................... B32B 5/18
11,512,441 B2 * 11/2022 Groeneweg ............ B60T 11/28
11,984,477 B2 * 5/2024 Wu .................. H01L 21/76254
12,031,282 B2 * 7/2024 Groeneweg .......... B60T 13/662
12,084,820 B2 * 9/2024 Groeneweg ............ E01F 13/02
2005/0141960 A1 * 6/2005 Schiefferly .......... E01F 15/148 404/6
2006/0044816 A1 * 3/2006 Groeneweg ............ E01F 13/02 340/431
2006/0151971 A1 * 7/2006 Buehler ................ B60D 1/167 280/446.1
2007/0187201 A1 * 8/2007 Carlsson ................ B60R 19/00 188/371
2008/0197614 A1 * 8/2008 Connors ........... B62D 33/0273 280/830
2008/0258362 A1 * 10/2008 Unrath ..................... F16F 7/12 267/64.25
2009/0166998 A1 * 7/2009 Groeneweg .......... E01F 15/088 256/13.1
2010/0219611 A1 * 9/2010 Groeneweg .......... E01F 15/145 280/482
2011/0163517 A1 * 7/2011 Groeneweg ............ E01F 15/00 280/789
2013/0049992 A1 * 2/2013 Mothaffar ................ G09F 9/33 340/908.1
2013/0084132 A1 * 4/2013 Groeneweg .......... E01F 15/088 404/6
2014/0239613 A1 * 8/2014 Groeneweg ............ E01F 13/02 280/400
2015/0225913 A1 * 8/2015 Groeneweg ............ B66C 23/36 404/6
2018/0029572 A1 * 2/2018 Schick ................. B60T 15/027
2018/0029578 A1 * 2/2018 Boulivan ............. B60T 13/662
2018/0261088 A1 * 9/2018 Roy ...................... E01F 15/148
2018/0326964 A1 * 11/2018 Koelzer ............... B60T 11/326
2019/0040597 A1 * 2/2019 Groeneweg ............ E01F 15/00
2019/0100890 A1 4/2019 Groeneweg
2019/0292739 A1 9/2019 Groeneweg
2020/0040537 A1 * 2/2020 Groeneweg ............... F41H 5/20
2020/0208363 A1 7/2020 Groeneweg
2020/0362525 A1 * 11/2020 Groeneweg ............ B60T 1/005
2022/0025593 A1 * 1/2022 Groeneweg .......... E01F 15/148
2023/0036319 A1 * 2/2023 Groeneweg ............ E01F 9/662
2023/0092342 A1 * 3/2023 Groeneweg .......... B62D 33/023 180/41
2023/0175216 A1 * 6/2023 Groeneweg .......... E01F 15/145 293/118
2024/0247541 A1 * 7/2024 Marocco .................. E06B 9/78
2024/0368850 A1 * 11/2024 Groeneweg ............ B60R 19/18

* cited by examiner

109

110
107
100
108
104
102
101
103
106
105

100

105
107
108
109
207
206
203
205
201
209
110
202
204
208

109
207
TowCushion
TC-20
205
201
301
110
101

700a
Tractor Couplings
701
703
704
Control Input
Control Input
707
708
Air Supply Line
Air Service Line
702
709
706
Air Brake System
Reservoir
Valve
705

700b
Tractor Couplings
701
703
704
Control Input
Control Input
Control Input
712
707
708
Conditioning Module
Air Supply Line
Air Service Line
702
710
706
Air Brake System
Reservoir
Compressor
Valve
711
705
709

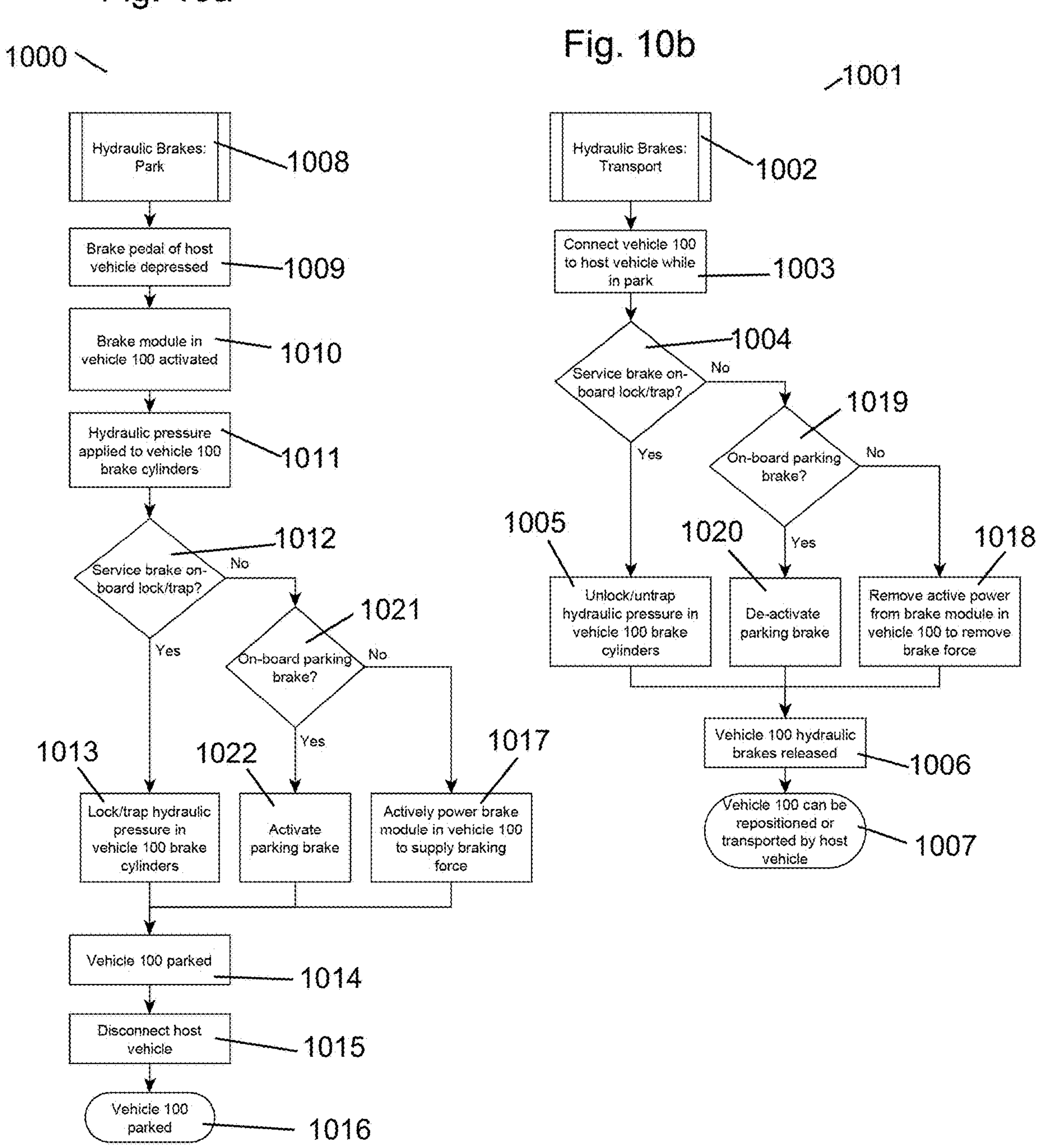

Fig. 10a
1000
Hydraulic Brakes: Park
1008
Brake pedal of host vehicle depressed
1009
Brake module in vehicle 100 activated
1010
Hydraulic pressure applied to vehicle 100 brake cylinders
1011
Service brake on-board lock/trap?
1012
No
Yes
On-board parking brake?
1021
No
Yes
1013
1022
1017
Lock/trap hydraulic pressure in vehicle 100 brake cylinders
Activate parking brake
Actively power brake module in vehicle 100 to supply braking force
Vehicle 100 parked
1014
Disconnect host vehicle
1015
Vehicle 100 parked
1016
Fig. 10b
1001
Hydraulic Brakes: Transport
1002
Connect vehicle 100 to host vehicle while in park
1003
1004
Service brake on-board lock/trap?
No
Yes
1019
On-board parking brake?
No
Yes
1005
1020
1018
Unlock/untrap hydraulic pressure in vehicle 100 brake cylinders
De-activate parking brake
Remove active power from brake module in vehicle 100 to remove brake force
Vehicle 100 hydraulic brakes released
1006
Vehicle 100 can be repositioned or transported by host vehicle
1007

TOWABLE CRASH-ATTENUATING VEHICLE

CROSS-REFERENCE TO RELATED APPLICATIONS

The present application is a continuation of U.S. application Ser. No. 18/070,316, filed Nov. 29, 2022, now U.S. Pat. No. 12,031,282, issued Jul. 9, 2024, which is a continuation of U.S. application Ser. No. 16/867,774, filed May 6, 2020, now U.S. Pat. No. 11,512,441, issued Nov. 29, 2022, which claims the benefits of U.S. Provisional Application Ser. No. 62/847,206, filed May 13, 2019, all having the same title, and which are incorporated herein by this reference.

BRIEF DESCRIPTION OF THE DRAWINGS

FIGS. 10*a* and 10*b* are flowcharts describing the operation of the towable crash-attenuating vehicle with a hydraulic brake system.

DETAILED DESCRIPTION OF THE DRAWINGS

Embodiments of a towable crash-attenuating vehicle are shown and described. The towable crash-attenuating vehicle comprises a frame having a right side, a left side, a front end and a rear end; at least two axles coupled to the frame, each of said axles having wheels attached thereto; a T-shaped ballast coupled to the frame, said T-shaped ballast oriented such that the weight of the ballast is biased toward the front end of the frame; deflection-reducing shields coupled to the right and left sides of the frame, wherein said deflection-reducing shields cover the frame and a majority of the wheels on each side of the vehicle; a tow connection coupled to the front of the frame, wherein said tow connection is pivotable from a deployed state to an undeployed state; a crash-attenuator coupled to the rear of the frame; wherein the vehicle is provided with a brake system, and wherein said brake system may be locked and unlocked and wherein said towable crash-attenuating vehicle is provided with an on-board mechanism for locking and unlocking the brake system.

Figure 1:
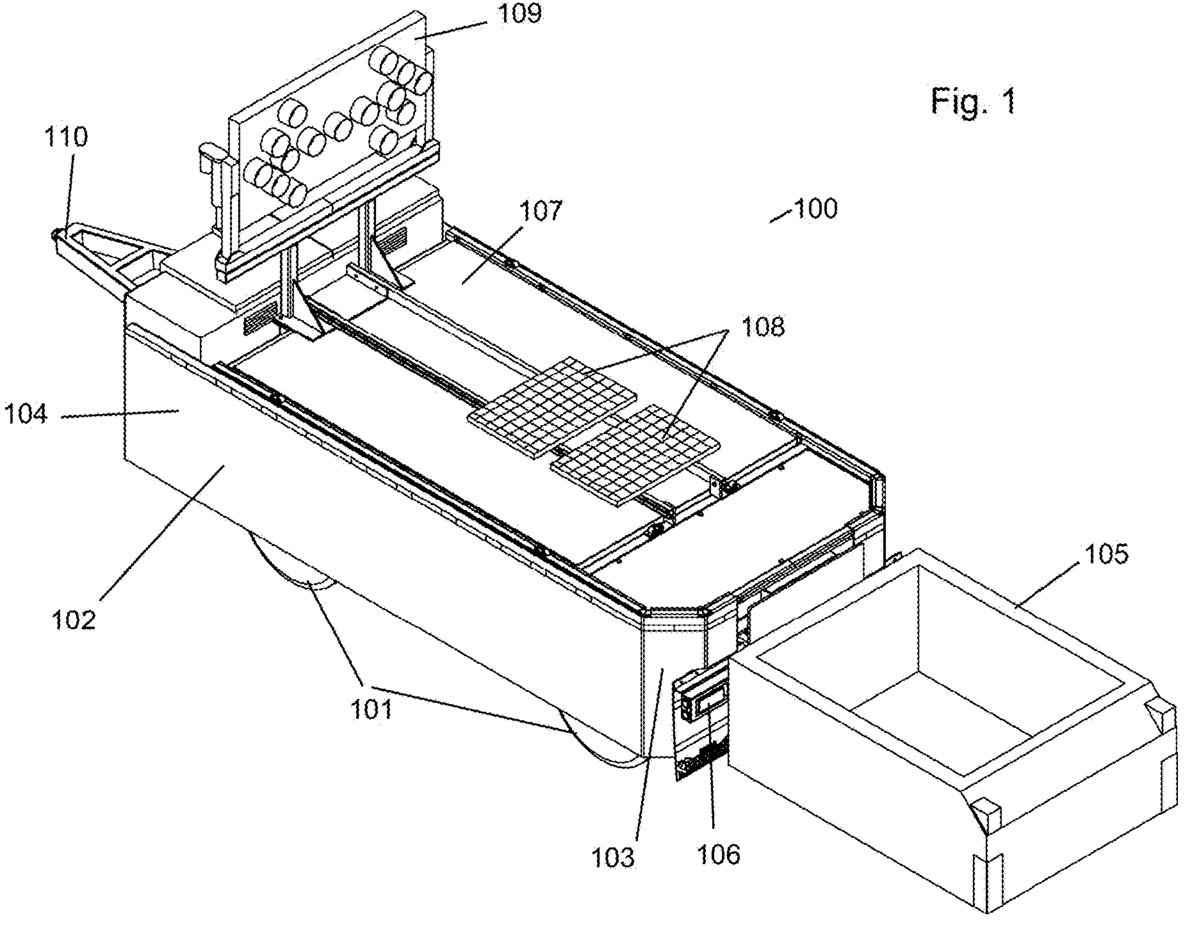
FIG. 1 is a left rear perspective view of the towable crash-attenuating vehicle.

FIG. 1 is a left rear perspective view of the towable crash-attenuating vehicle 100. Like numerals will be used to identify elements common to all figures. Thus, in FIG. 1, the towable crash attenuating vehicle has left side wheels 101, which are visible at the bottom of the vehicle 100. The left side wheels 101 are attached to axles (not shown) coupled to the frame of the vehicle 100. Overlying the wheels 101 is the left side deflection shield 102. As can be clearly seen in FIG. 1, the left side deflection shield 102 covers the entire left side of the vehicle 100, and it covers the majority of the wheels 101. Left side deflection shield 102 is provided with an angled section 103. Angled section 103 is provided in place of having a corner in the area of the angled section 103. In this way, the angled section 103 prevents an impacting vehicle from snagging on the vehicle 100. Instead a vehicle impacting on the angled section 103 will be redirected away from the vehicle 100 instead of catching on it. It should be appreciated that angled section 103 may also take the form of a rounded section to deflect vehicles. The flat portion 104 of the left side deflection shield also performs this deflection function by presenting a smooth surface to impacting vehicles, such that they will be redirected away from vehicle 100 instead of entangling with the vehicle 100. The left side deflection shield also helps to protect the vehicle 100 and it prevents “underrides,” i.e. vehicles wedging under the vehicle 100. It should be appreciated that the left side deflection shield may be formed from any material of suitable strength for the application, including without limitation, steel plate, hardened aluminum, etc. The left side deflection shield 102 may be fastened to the frame of the vehicle 100 by any means known in the art.

Attached to the rear end of vehicle 100 is the impact attenuator 105. The impact attenuator 105 is designed to absorb some of an impacting vehicle’s kinetic energy and also to re-direct an impacting vehicle away from the vehicle 100. The impact attenuator 105 may, for example, be designed to partially or completely crumple to absorb kinetic energy from the impacting vehicle. The impact attenuator may take the form of known attenuators in the art, or it could be specially designed for this application. The impact attenuator 105 may be fastened to the frame of the vehicle 100 by any means known in the art. Also visible in FIG. 1 is a tail light 106. The tail light 106 may be mounted on a breakaway mounting or similar device such that it can be easily replaced in the event of a rear end impact on the vehicle 100.

The vehicle 100 is provided with a top cover 107, which covers the internal structure of the vehicle 100. Overlying the top cover 107 are solar panels 108. The solar panels 108 may provide electricity to onboard battery packs supplying electricity for the vehicle warning lights, side lights, the impact attenuator, the brake systems and other systems on-board the vehicle 100. For example, the solar panels 108 may provide electricity to a battery pack to power an on-board brake system, as will be discussed below. Additionally, the solar panels 108 may provide electricity to onboard battery packs which in turn power the warning lights 109 attached to the vehicle 100. The warning lights 109 may take the form of a directional arrow warning light as shown, or they could take the form of other warning lights known in the art depending on the intended application of the vehicle 100 and any local regulations on the type, size, or number of warning lights on vehicles such as vehicle 100. Also visible in FIG. 1 is the tow connection 110. As will be discussed in greater detail below, the tow connection 110 provides a point of connection where the vehicle 100 can connected to a host vehicle for towing to a desired location.

Figure 2:
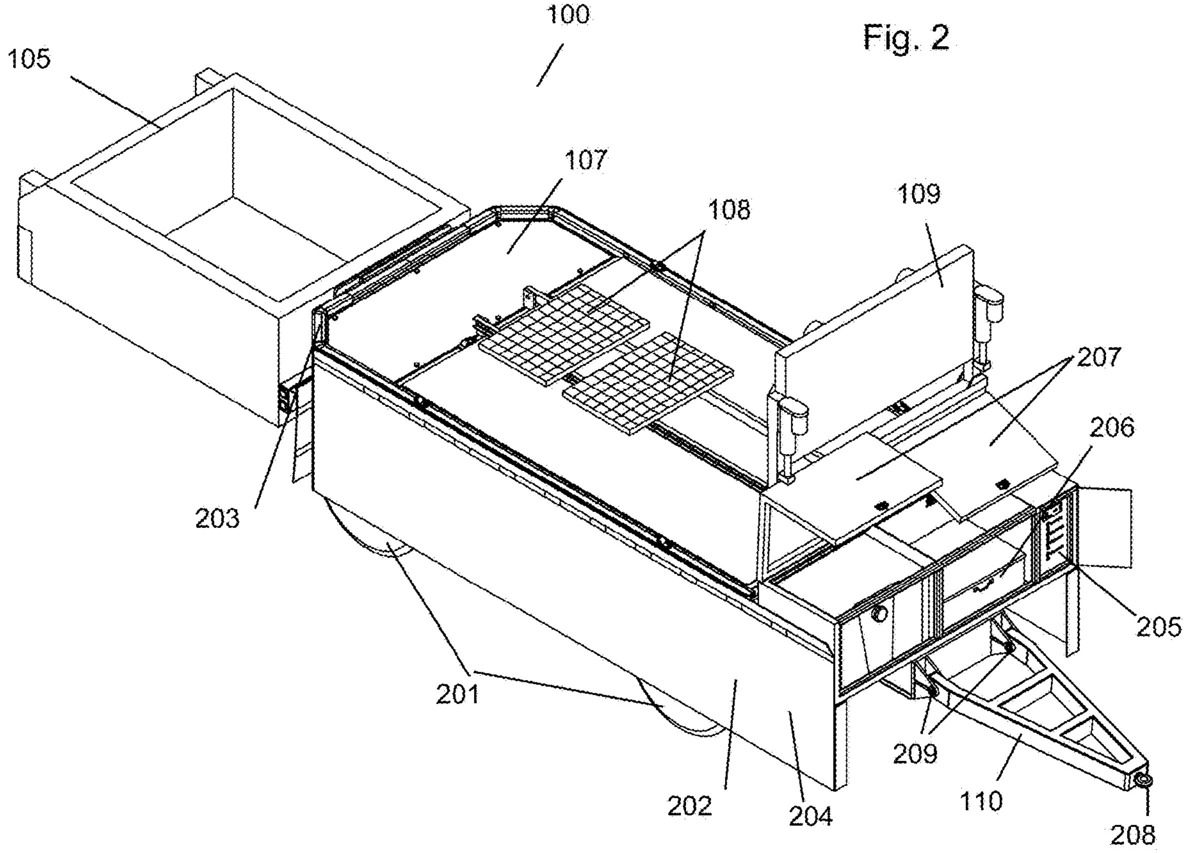
FIG. 2 is a right front perspective view of the towable crash-attenuating vehicle.

FIG. 2 is a right front perspective view of the towable crash-attenuating vehicle. Some elements which were previously identified in the description FIG. 1 are also visible in FIG. 2. Thus, the impact attenuator 105, the top cover 107, the solar panels 108 and the warning lights 109 are as described with respect to FIG. 1. In FIG. 2, the towable crash attenuating vehicle has right side wheels 201, which are visible at the bottom of the vehicle 100. The right side wheels 201 are attached to axles (not shown) coupled to the frame of the vehicle 100. It should be appreciated that the same axles connect the left side and right side wheels, 101 and 201 respectively, so there is a common axle between each of the right and left side wheels, as is known in the art. Alternatively, the left and right side wheels 101 and 201 respectively, could be coupled to the frame of the vehicle 100 by, for example, a fixed spindle, and without the use of an axle. Any means known in the art for coupling wheels to a frame is encompassed with this disclosure.

Overlying the wheels 201 is the right side deflection shield 202. As can be clearly seen in FIG. 2, and similar to the arrangement described with respect to the left side of the vehicle 100, the rights side deflection shield 202 covers the entire right side of the vehicle 100, and it covers the majority of the wheels 201. Right side deflection shield 202 is provided with an angled section 203. As was described with respect to the left side, angled section 203 is provided in place of having a corner in the area of the angled section 203. In this way, the angled section 203 prevents an impacting vehicle from snagging on the vehicle 100. Instead a vehicle impacting on the angled section 203 will be redirected away from the vehicle 100 instead of catching on it. As noted for left deflection shield angled section, the right side angled section may alternatively be a rounded section. The flat portion 204 of the left side deflection shield also performs this deflection function by presenting a smooth surface to impacting vehicles, such that they will be redirected away from vehicle 100 instead of entangling with the vehicle 100. The right side deflection shield also helps to protect the vehicle 100 and it prevents "underrides," i.e. vehicles wedging under the vehicle 100. It should be appreciated that, as with the left side, the right side deflection shield may be formed from any material of suitable strength for the application, including without limitation, steel plate, etc. The right side deflection shield 202 may be fastened to the frame of the vehicle 100 by any means known in the art.

Also shown in FIG. 2 is control panel 205. Control panel 205 is covered by a door shown in FIG. 2. Control panel 205 controls the on-board systems of the vehicle 100. For example, the control panel 205 may provide switches for activating and deactivating the warning lights 109. Further the control panel 205 may provide switches and/or valves for controlling an on-board brake system for the vehicle 100. The vehicle 100 is provided with an on-board brake system (not shown). In one embodiment, the on-board brake system may be an air-brake system, as would be commonly found on heavy-duty trucks and vehicles. An air brake system may consist of service brakes, parking brakes, a brake pedal, and an air storage tank. For the parking brake, there is a disc or drum arrangement which is designed to be held in the "applied" position by spring pressure. Air pressure must be produced to release these "spring brake" parking brakes. For the service brakes (i.e. the ones used while driving for slowing or stopping) to be applied, the brake pedal in the host vehicle is pushed, routing the air under pressure (by way of example and without limitation between 100-120 psi) to the brake, causing the brake to be engaged. Either drum brakes or disc brakes can be used in an air-brake system. Vehicles with air brakes have an air compressor that compresses atmospheric air and forces it into high-pressure storage tanks at approximately 120 psi. Setting of the parking/emergency brake releases the pressurized air in the lines between the compressed air storage tank and the brakes, thus allowing the spring actuated parking brake to engage. A sudden loss of air pressure results in full spring brake pressure immediately.

Figure 7A:
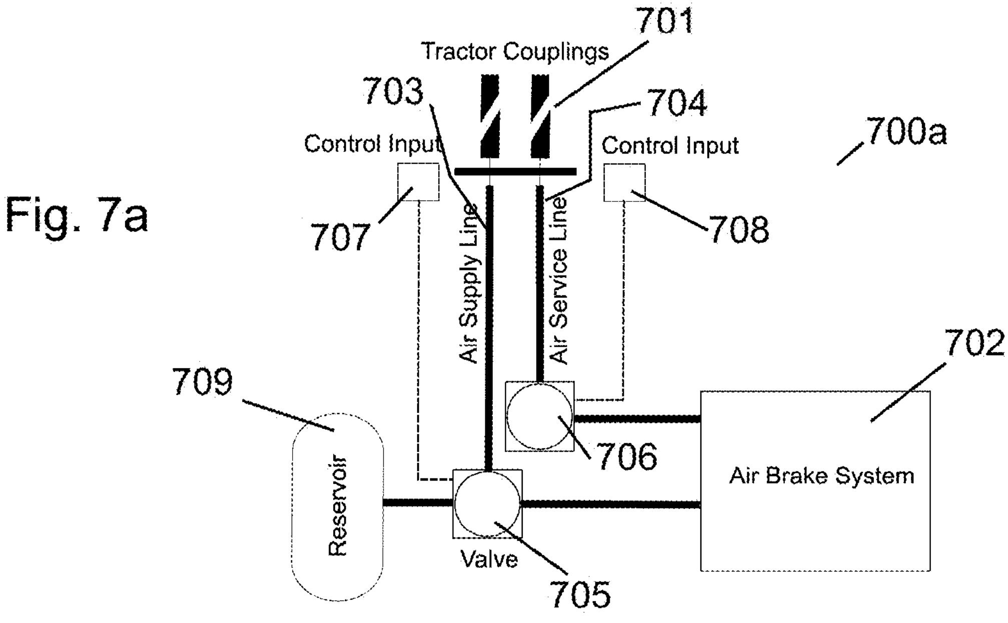
FIGS. 7*a* and 7*b* are system diagrams of an air brake system for the towable crash-attenuating vehicle.
Figure 7B:
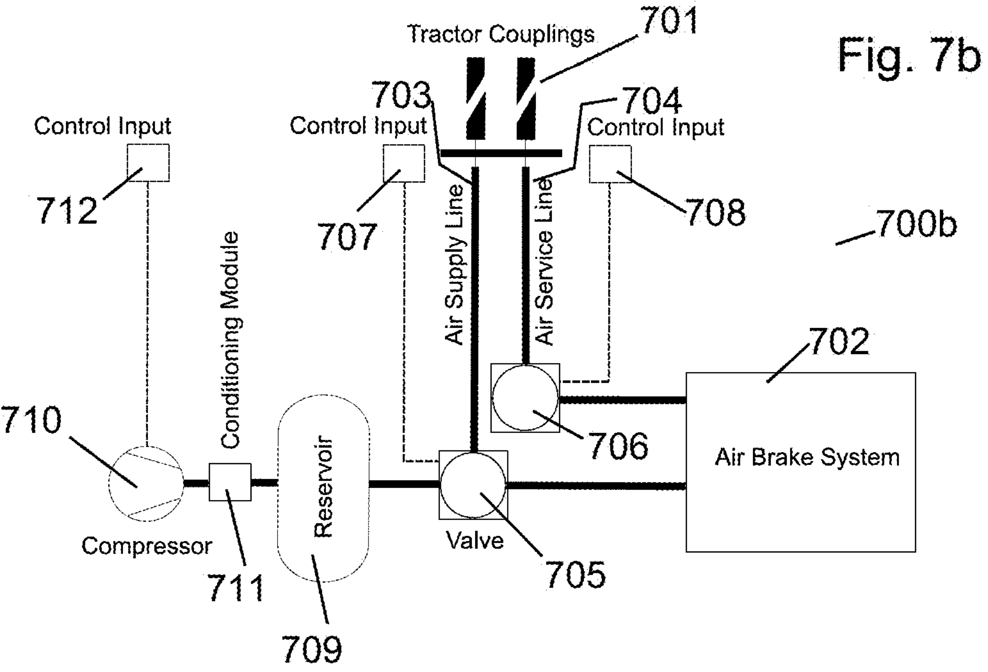

Reference is now made to FIGS. 7*a* and 7*b*, which are system diagrams showing two embodiments, 700*a* and 700*b*, of an air brake system for use with the vehicle 100. Both embodiments 700*a* and 700*b* have tractor couplings 701, which may couple the air brake system 702 of the vehicle 100 to an air brake system on the host vehicle. Both embodiments 700*a* and 700*b* also have air supply lines 703 and air service lines 704, which are controlled by valves 705 and 706, respectively. In operation, air supply line 703 provides a supply of air to disengage the "spring brake" parking brakes, as discussed above, and air service line 704 provides air pressure to apply the service brakes, also as discussed above. Each of the valves 705 and 706 may be controlled by control inputs 707 and 708 respectively. It should be appreciated that the control inputs 707 and 708 for valves 705 and 706 could be as simple as manually operating the valves 705 and 706. Alternatively, the valves 705 and 706 could be controlled electrically. As will be discussed below with respect to the processes of moving and parking the vehicle 100, described in the flow charts of FIGS. 9*a* and 9*b*, the valves 705 and 706 may be used to trap or release pressure in the air brake system 702 as necessary.

Also shown in FIGS. 7*a* and 7*b* is a reservoir 709. The reservoir 709 may contain a supply of pressurized air, so that the air brake system 702 may be operated when the vehicle 100 is not connected to a host vehicle's air brake system. In the embodiment 700*a* shown in FIG. 7*a*, the system has only a reservoir 709 of compressed air to operate the air brake system 702. In embodiment 700*a*, the reservoir 709 may be filled with compressed air from the air supply line 703 connected to the host vehicle's air brake system. Thus, in embodiment 700*a*, when the vehicle 100 is disconnected from a host vehicle, compressed air from reservoir 709 may be released through valve 705 into the vehicle 100's air brake system 702, to release the "spring brake" parking brakes and allow the vehicle 100 to be moved. When the vehicle 100 is relocated to a desired position, valve 705 can be closed and the "spring brake" parking brake re-applied.

Embodiment 700*b* is the same in all respects as embodiment 700*a*, except that in 700*b* a compressor 710 is also provided in the vehicle 100. As shown in FIG. 7*b*, the compressor 710 may be used to fill reservoir 709 with compressed air to operate the air brake system 702 on the vehicle 100 as discussed above with respect to embodiment 700*a*. The embodiment in 700*b* therefore does not require the reservoir 709 to be filled from the host vehicle's system, and it provides more flexibility for repositioning the vehicle 100, as such operations are not limited by the capacity of the reservoir 709. Compressor 710 may be provided with a conditioning module 711, which conditions the compressed air, by for example removing condensed water from the compressed air stream before it reaches the reservoir 709. Compressor 710 is controlled by a control input 712, that switches the compressor on and off as needed.

Figure 9A:
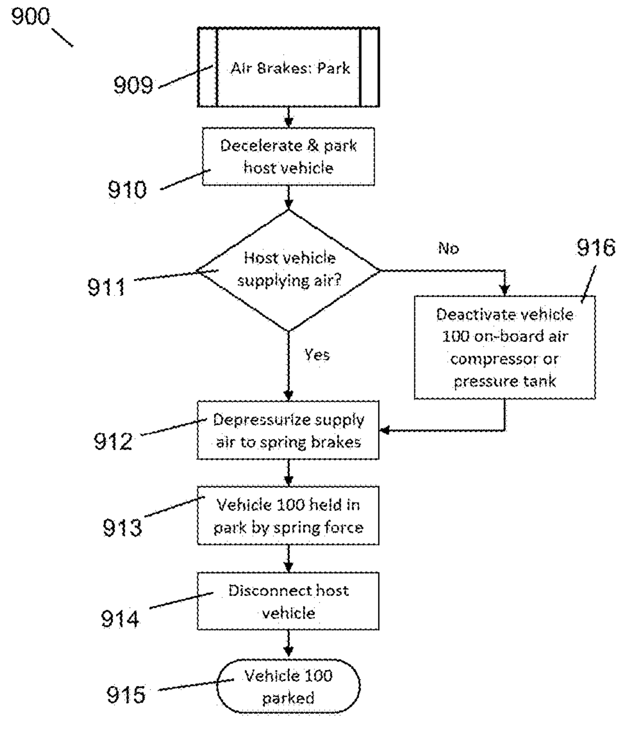
FIGS. 9*a* and 9*b* are flowcharts describing the operation of the towable crash-attenuating vehicle with an air brake system.
Figure 9B:
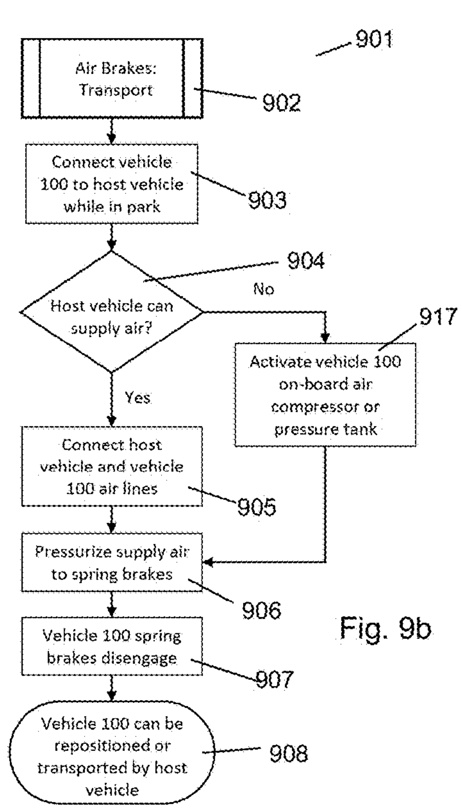

Reference is now made to FIGS. 9*a* and 9*b* which are flowcharts describing the processes of movement 901 and parking 900 of the towable crash-attenuating vehicle with an air brake system. If the vehicle 100 is provided with air brakes, the vehicle 100 may be connected to a host vehicle's air system via the tractor couplings 701, shown in FIGS. 7*a-b*, for towing to a desired location. Similarly in steps 902 and 903 in FIG. 9*b*, the vehicle 100 is connected to a host vehicle. As shown in FIG. 9*b*, step 904, while in tow behind the host vehicle, the vehicle 100's brake system may act as a normal air brake system, if the host vehicle can supply air. Thus, as in step 905, the vehicle is connected to the host vehicle's air lines, and in step 906 compressed air from the host vehicle is provided. In step 907, the compressed air overrides the spring brake pressure on the vehicle 100's brake system, so that in step 908 the vehicle 100 can be moved by the host vehicle.

In FIG. 9*a*, in steps 909 and 910, when the brake pedal of the host vehicle was depressed, air pressure would cause the brakes on the vehicle 100 to be applied. If, as in step 911, the host vehicle is providing air to the vehicle 100, when the vehicle is positioned in a desired location, the host vehicle would be disconnected from the vehicle 100 in step 912, and when the host vehicle's air system is disconnected, in step 913 the spring actuated parking brake on the vehicle 100 will be engaged. The host vehicle may then be disengaged in step 914 and the vehicle 100 will be parked, as in step 915, and wheels 101 and 201 on the vehicle 100 will not be able to move.

A variation on the processes of moving 901 and parking 900 the vehicle 100 is shown in FIGS. 9*a-b*, steps 916 and 917. If the vehicle 100 is provided with air brakes, the vehicle 100 may also be provided with an on-board air compressor and/or an on-board high-pressure air reservoir. The on-board air compressor and/or on-board high pressure air reservoir may be operated by the control panel 205 on the vehicle 100. Thus, in step 917 if a user desires to move vehicle 100, the user can start the on-board compressor and/or release air from the on-board high pressure air reservoir to release the spring brake pressure of the vehicle 100's air brake system, so that the vehicle 100 may be moved. When the vehicle 100 is re-positioned to a desired location, in step 916 the user may deactivate the on-board compressor and/or discontinue the release of air from the on-board high pressure air reservoir, thereby re-activating the spring actuated parking brake and preventing the wheels 101 and 201 from moving.

In another embodiment, the on-board brake system may be a hydraulic brake system. In a hydraulic brake system, when a brake pedal is pressed, a pushrod exerts force on a piston in a master cylinder, causing fluid from the brake fluid reservoir to flow into a pressure chamber through a compensating port. This results in an increase in the pressure of the entire hydraulic system, forcing fluid through the hydraulic lines. The hydraulic fluid then causes pistons in a caliper to apply force to brake pads, pushing them against the spinning rotor (a disc brake system); or the hydraulic fluid causes brake shoe(s) to be pressed against the inside of a spinning drum (a drum brake system). Subsequent release of the brake pedal returns the master cylinder piston(s) to the released position, relieving the hydraulic pressure on the brake system.

Figures 8A, 8B:
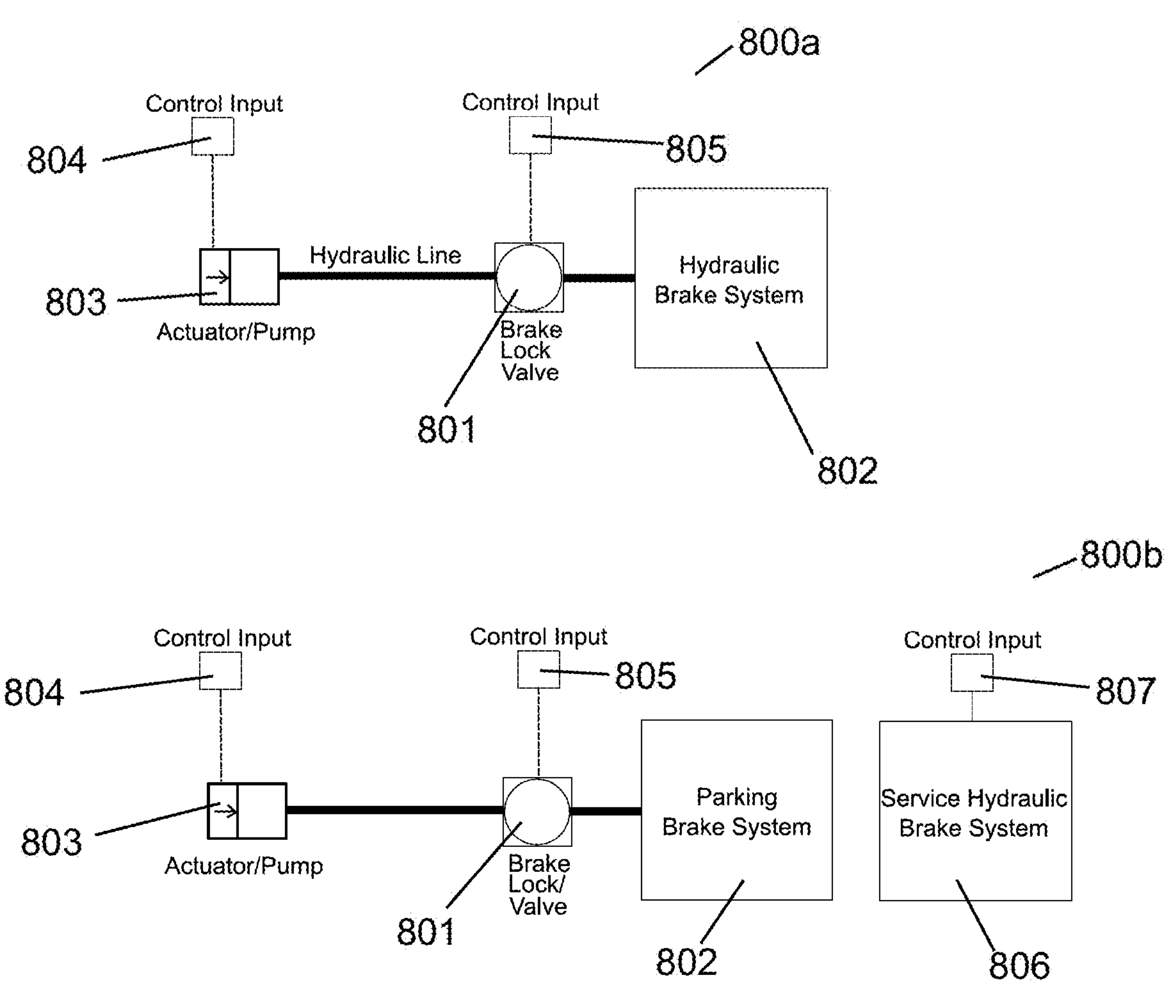
FIGS. 8*a* and 8*b* are system diagrams of a hydraulic brake system for the towable crash-attenuating vehicle.

Reference is now made to FIGS. 8*a* and 8*b*, which are system diagrams showing embodiments 800*a* and 800*b* of a hydraulic brake system for use with the vehicle 100. Both embodiments 800*a* and 800*b* have a brake lock valve 801 in fluid communication with the hydraulic brake system 802 on the vehicle 100. Also shown in FIGS. 8*a-b* is actuator/pump 803, also in fluid communication with the brake lock valve 801. In operation, actuator/pump 803 provides hydraulic pressure to engage the hydraulic brake system 802, as discussed above, and the brake lock valve traps this hydraulic pressure in the hydraulic brake system 802, thereby locking the brakes on the vehicle 100. Each of the brake valve 801 and the actuator/pump 803 may be controlled by control inputs 805 and 804 respectively. It should be appreciated that the control input 805 for brake lock valve 801 could be as simple as manually operating the valve 801, and the control input 804 for actuator/pump 803, could be as simple as turning on the actuator/pump 803. Alternatively, the valve 801 and actuator/pump 803 could be controlled electrically. As will be discussed below with respect to the processes of moving and parking the vehicle 100, described in the flow charts of FIGS. 10*a* and 10*b*, the brake lock valve 801 and actuator/pump 803 may be used to trap or release pressure in the hydraulic brake system 802 as necessary. As can be seen in FIG. 8*b*, the embodiment 800*b* also includes a service hydraulic brake system 806, which is separate from the parking hydraulic brake system 802. Service hydraulic brake system can have the general form described herein, and it has a control input 807 for selectively engaging and releasing the service brakes.

Reference is now made to FIGS. 10*a* and 10*b* which are flowcharts describing the processes of movement 1001 and parking 1000 of the towable crash-attenuating vehicle with a hydraulic brake system. In steps 1002 and 1003 in FIG. 10*b*, the vehicle 100 is connected to a host vehicle. If the vehicle 100 is provided with hydraulic brakes, the vehicle 100 may be connected to a host vehicle's hydraulic brake system for towing to a desired location. While in tow behind the host vehicle, the vehicle 100's brake system would act as a normal hydraulic brake system, wherein hydraulic pressure from the host vehicle is applied to the brake system, in steps 1010 and 1011 of the vehicle 100 when the brake pedal in the host vehicle is depressed in step 1009. Alternatively, the vehicle 100 may not be directly connected to the host vehicle's hydraulic brake system. In this case, when the brake pedal of the host vehicle was depressed in step 1009, an electric signal would activate the brake module in the vehicle 100, as in step 1010 which in turn applies hydraulic pressure (e.g. directly or via a master cylinder) which would cause the brakes on the vehicle 100 to be applied, as in step 1011. Any signal known to the art, for example and without limitation, electrical, mechanical, or air signals could send control signals to the brake module in the vehicle 100 which in turn applies hydraulic pressure, either directly or via a master cylinder. It should be appreciated that any connection type known in the art for connecting hydraulic brakes between a tractor and trailer is included within the scope of this disclosure, including without limitation, Electric over Hydraulic Brakes (where a host vehicle sends electrical signal to trailer hydraulic master cylinder), Air over Hydraulic Brakes (where a host vehicle sends an air signal to trailer hydraulic master cylinder), and Hydraulic Surge Brakes (where the momentum of the trailer mechanically actuates trailer master cylinder piston).

When the vehicle 100 is positioned in a desired location, the host vehicle would be disconnected from the vehicle 100, in step 1015. If the vehicle 100 has an on-board lock or trap for hydraulic pressure as in step 1012, then prior to disconnecting the host vehicle, the host vehicle may apply hydraulic pressure to the vehicle 100's brake system, as in step 1013. Additionally, if the vehicle 100 has an on-board parking brake in step 1021, that on-board parking brake is activated in step 1022. If the vehicle 100 has neither a service brake on-board lock/trap or an on-board parking brake, a mechanical or electrical system on the vehicle 100 may be activated to apply hydraulic pressure as in step 1017. The hydraulic pressure may be derived from an electrically activated master cylinder or a hydraulic pump. This hydraulic pressure may then be trapped in the vehicle 100's brake system by means of a valve. The valves used to trap pressure in the vehicle 100's brake system may be either manually operated or electrically actuated, any valves known in the art capable of withstanding the pressures associated with hydraulic brake systems may be used. The valve may be operated from the control panel 205 on the vehicle 100. When the valve is closed, and pressure from the host vehicle is trapped in the vehicle 100's brake system, the host vehicle may then be disengaged in step 1015 and the vehicle 100 will be parked, as in steps 1014 and 1016, and wheels 101 and 201 on the vehicle 100 will not be able to move.

If the vehicle 100 is provided with hydraulic brakes, the vehicle 100 may also be provided with an on-board hydraulic pump and/or an electrically activated master cylinder. The on-board hydraulic pump and/or electrically activated master cylinder may be operated by the control panel 205 on the vehicle 100. If the vehicle 100 has an on-board lock or trap for hydraulic pressure as in step 1004, if a user desires to move vehicle 100, the user can open the valve on the control panel 205 to release the hydraulic pressure trapped in the vehicle 100's brake system as in step 1005, thereby releasing the vehicle 100's brake system in step 1006, so that the vehicle 100 may be moved, in step 1007. Additionally, if the vehicle 100 has an on-board parking brake as in step 1019, that parking brake may be deactivated as in step 1020. If the vehicle 100 does not have an on-board lock or trap for hydraulic pressure or an on-board parking brake, as in step 1018, then the user removes active power from the brake module in vehicle 100 to remove brake force. When the vehicle 100 is re-positioned to a desired location, the user may activate the on-board hydraulic pump, thereby re-pressurizing the vehicle 100's brake system. With the vehicle 100's brake system set, the user can then close the valve on the control panel 205, re-trapping pressure in the vehicle 100's brake system and preventing the wheels 101 and 201 from moving. By using the valve to trap pressure in the system, the on-board hydraulic pump or electrically activated master cylinder need not constantly be operating. Instead, the on-board hydraulic pump or electrically activated master cylinder could be activated for a short time to increase the pressure in the system, and then the valve can trap pressure and the on-board hydraulic pump or electrically activated master cylinder may be deactivated. If the user desired to re-position the vehicle 100 again, this process of releasing the pressure in the vehicle 100's brake system by opening valve, and the re-pressurizing the vehicle 100's brake system by the on-board hydraulic pump and closing the valve to retain the pressure in the system could be repeated as many time as the user desires.

Considering the on-board hydraulic pump and valve as a parking brake system, several other known hydraulic parking brake systems can also be envisioned. For example, a "Spring Applied Hydraulic Released Park Brake" in which a hydraulic parking brake operates similarly to an air spring parking brake, except the fluid medium is hydraulic (i.e. hydraulic pressure is required to overcome the spring force and release the parking brake). Some brakes combine service & parking functionality in the same mechanism. Otherwise, if separate hydraulic service and hydraulic park brakes are used, hydraulic pressure in the parking brake circuit is commonly generated by a separate pressure source & lock/valve from the service brake circuit. For example, a separate actuator/pump might apply hydraulic pressure to overcome the spring force & keep the parking brake from being applied. The actuator/pump might be equipped with a lock/valve to retain hydraulic pressure. When the lock/valve is released, the spring applies the parking brake. Finally, a mechanically actuated disk or drum parking brake could be used. The parking brake is applied when a force is applied to the brake. The mechanical actuation force could be provided by a mechanical lever, actuator, etc and could be equipped with a lock-out mechanism.

Also shown in FIG. 2 are the compartments 206 enclosed by doors 207. The compartments 206 may be provided for the storage of tools or other items necessary at a work site. Additionally, the on-board air compressor, the on-board high-pressure air reservoir, or the on-board hydraulic pump, all of which have been previously described, could be located in the compartments 206. Additionally a battery pack (not shown) or a generator (not shown) could be located in compartments 206 to provide power for the on-board systems in addition to, or in replacement of, the power supplied by the solar panels 108. A battery pack may be provided which would typically consist of one or more batteries, e.g. six batteries may be used. The batteries in the battery pack may be charged by the solar panels 108 and/or the generator. The solar panels 108 may provide an ongoing trickle charge with overcharge protections. The generator may provide a rapid charge when needed, also with overcharge protection.

Finally, the tow connection 110 is visible in FIG. 2. The tow connection 110 has a hitch 208 at the front end, and is attached to the vehicle 100 by hinges 209 at the rear end. The hitch 208 on the tow connection 110 may be any standard hitch or any other manner of connection suitable for connecting the vehicle 100 to a host vehicle for towing. Additionally, the hitch 208 may be removable, such that different types of hitches may be installed on the tow connection 110, to accommodate different types of host vehicles. The hinges 209 on the tow connection 110, allow the tow connection 110 to move from a deployed position to an un-deployed position. In FIG. 2, the tow connection 110 is shown in the deployed position. In the deployed position, the tow connection 110 is generally horizontal, such the hitch 208 can be engaged with a host vehicle. When the tow connection 110 is moved to the un-deployed position, tow connection 110 is rotated to a generally vertical position about the hinges 209. In the un-deployed position, the tow connection 110 is out of the way, and presents less of a possibility of becoming entangled with an impacting vehicle. The tow connection 110 may also be provided with a lock mechanism (not shown) to prevent tow connection 110 from falling into the deployed position if vehicle 100 is impacted by another vehicle.

Figure 3:
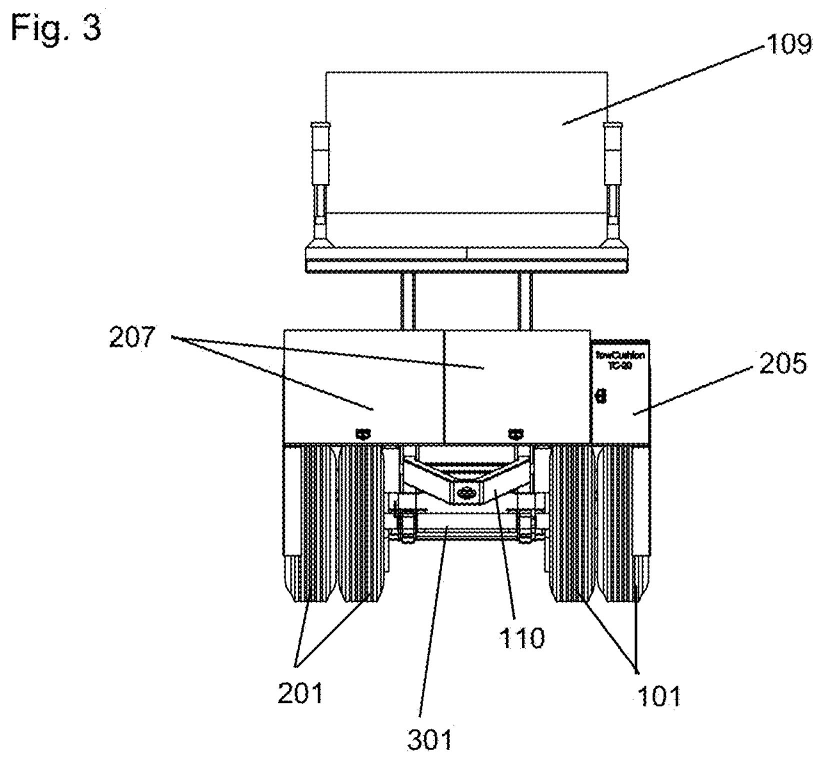
FIG. 3 is a front view of the towable crash-attenuating vehicle.
Figure 4:
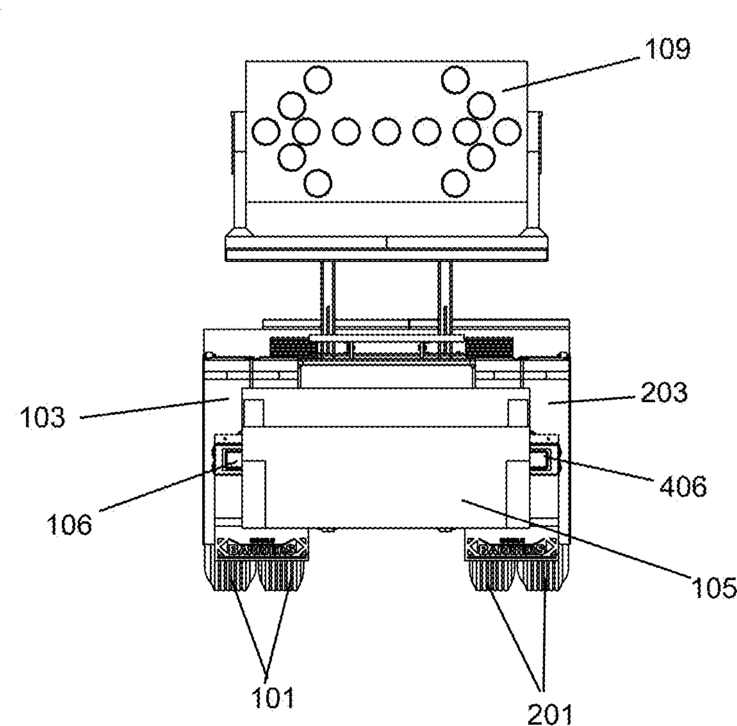
FIG. 4 is a rear view of the towable crash-attenuating vehicle.
Figure 5:
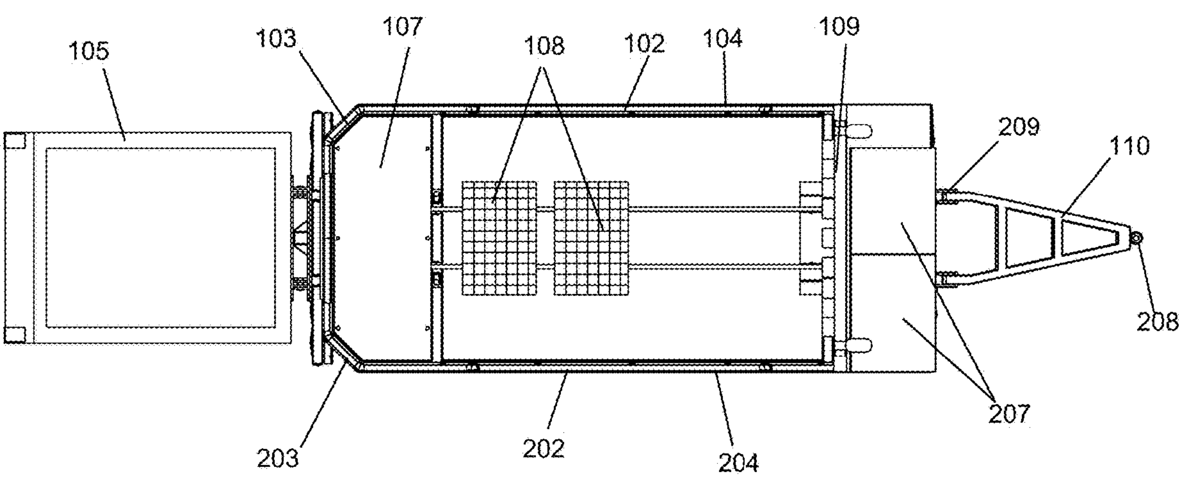
FIG. 5 is a top view of the towable crash-attenuating vehicle.

FIGS. 3, 4 and 5 are front, rear and top views of the towable crash-attenuating vehicle, respectively. Like numerals will be used to identify elements already described. Thus in FIG. 3, the left and right side wheels 101 and 201 are visible, as are the doors 207, and the door covering control panel 205, the tow connection 110 and the warning lights 109. It should be appreciated that any type of signage may be used in place of or in addition to warning lights 109. As shown in FIG. 3, warning lights 109 comprises an arrowboard, with various patterns which can be set to a right arrow, left arrow, or flashing lights. Another option is a "matrix board" having a matrix of lights that can be programmed to provide right or left arrows or alphanumeric characters to create messages. Radar, cameras, communications equipment or other electronics can also be incorporated into the structure of warning lights 109. Visible in FIG. 3 is axle 301 connecting the left and right side wheels 101 and 201. As can be seen in FIGS. 3 and 4, the left and right side wheels 101 and 201 can each comprise two wheels on each side to accommodate the weight of vehicle 100, which may be approximately 20,000 lbs. It should be appreciated that this is only an exemplary embodiment, and other variations on the weight of the vehicle 100 and the numbers of axles and wheels are included in this disclosure. For example, only a single wheel could be provided on either axle, or three or more axles, with or without two wheels on each side could be provided. The number of axles and wheels is determined by the weight of the vehicle 100. Thus, in cases where the vehicle 100 is very heavy, more axles and wheels may be provided. In FIG. 4, the left and right side wheels 101 and 201 are visible, as are the left and rights side angled sections 103 and 203, and the impact attenuator 105, the tail light 106 and the warning lights 109. Also visible in FIG. 4 is the right side tail light 406. In the top view of FIG. 5, the impact attenuator 105 is visible, as are the left and right side angled sections 103 and 203, the left and right side deflection shields 102 and 202, with flat portions 104 and 204, the top cover 107, the solar panels 108, the warning lights 109, the tops of the doors 207, and the tow connection 110 with hitch 208 and hinges 209.

Figure 6:
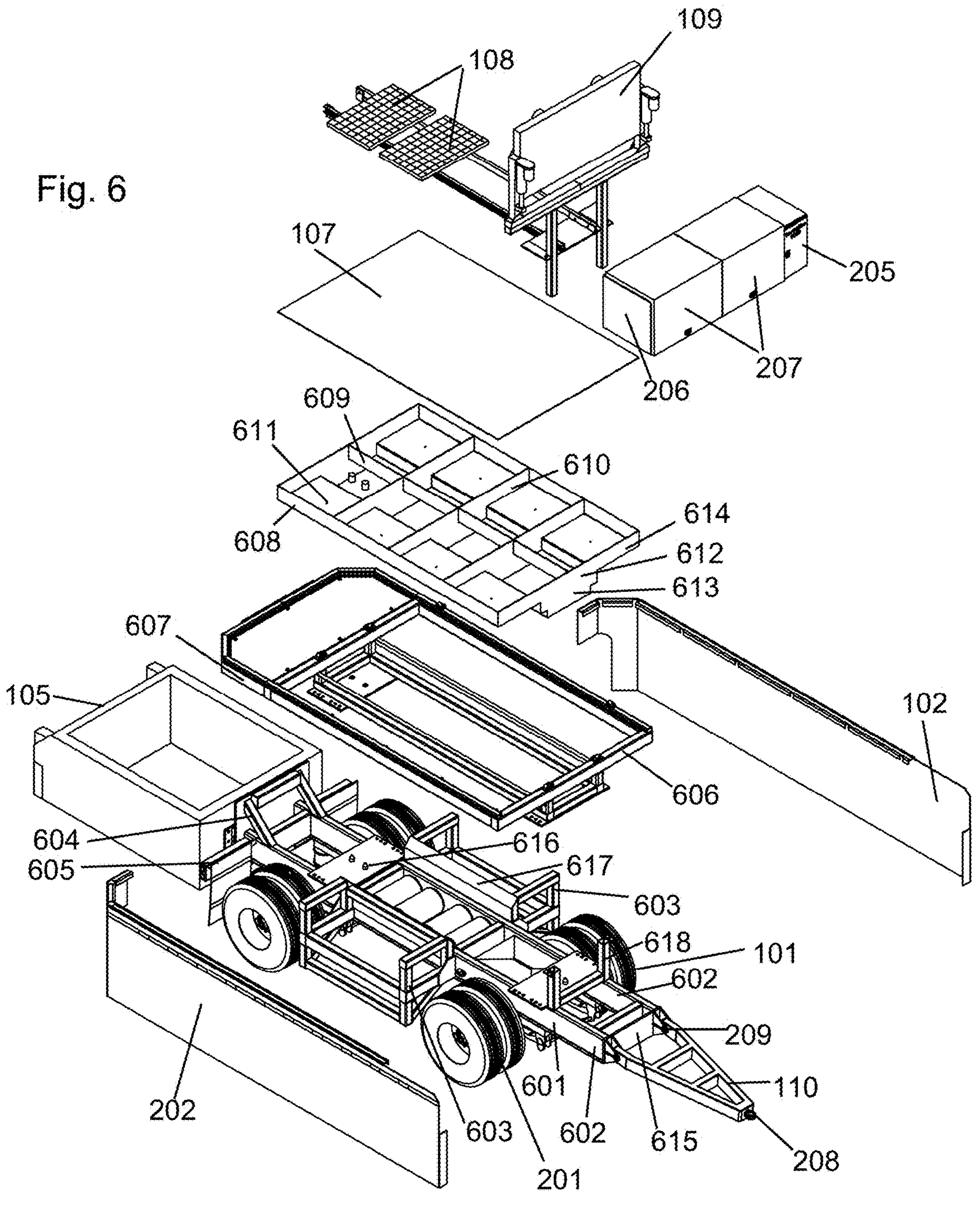
FIG. 6 is an exploded view of the towable crash-attenuating vehicle.

FIG. 6 is an exploded view of the towable crash-attenuating vehicle. Like numerals will be used to identify elements already described. Thus in FIG. 6, the solar panels 108, the warning lights 109, the doors 207 to compartments 206, the door to control panel 205, the top cover 107, the impact attenuator 105, the left and right deflection shields 102 and 202, and the left and right wheels 101 and 201 are visible. Also visible in FIG. 6 is the tow connection 110 with hitch 208 and hinge 209. FIG. 6 shows the frame 601 of the vehicle 100. The frame 601 has two longitudinal members 602, which substantially define the length of the frame 601. The axles (not shown in FIG. 6) may be coupled to the longitudinal members 602. Coupled to the outboard sides of the longitudinal members 602 are the deflection shield attachment members 603. The deflection shield attachment members 603 substantially define the width of the frame 601, and they provide a framework to which the deflection shields, 102 and 202 respectively, attach to the vehicle 100. The deflection shield attachment members 603 prevent the deflection shields from pushing in between the wheels, and help protect the wheels, axles and suspension in the event of an impact. The frame 601 also has an impact attenuator mounting member, 604 which connects the impact attenuator 105 to the frame 601. Finally, the frame 601 has a rear end 605. The tail lights (previously identified) are mounted on the rear end 605.

As can be seen in FIG. 6, a ballast support member 606 may also be provided. Ballast support member 606 may be attached to the deflection shield attachment members 603 and the longitudinal members 602, so that the weight of the ballast is appropriately distributed to the frame 601. Additionally, the deflection shields, may be further attached to the vehicle by attaching them to the edge 607 of the ballast support member 606. Additionally, LED running lights may be provided along the edge 607 or 2" round running lights could be placed on the deflection shields 102 and 202 respectively. It should be appreciated that the longitudinal members 602, the deflection shield attachment members 603, and the ballast support member 606 may be made of any material of suitable strength for the application, including without limitation billet, cast, channel or tube steel, aluminum or composite materials.

Received within the ballast support member 606 is sheet metal box 608. Sheet metal box 608 contains the material that comprises the ballast for the vehicle 100. It should be appreciated that in FIG. 6, the sheet metal box 608 is empty, but in use the sheet metal box would be filled with ballast material. In one embodiment, sheet metal box 608 would be filled with concrete to create ballast for vehicle 100. It should be further appreciated that any suitably heavy material could be used to comprise the ballast for vehicle 100, including by way of example and without limitation crushed rock, sand, dirt, water, metallic and/or composite ballast material or other suitable materials of adequate weight. Sheet metal box 608 may be provided with longitudinal stringers 609 and lateral stringers 610 to divide the sheet metal box 608 into sections. Further, drain holes 611 may be provided in the bottom of sheet metal box 608 to prevent the accumulation of water in the sheet metal box 608. It should be appreciated that sheet metal box 608 may be made of any material of suitable strength for the application, including without limitation steel sheet metal, hardened aluminum, ceramic materials, composite materials, etc. The sheet metal box 608 and the ballast therein contained has a generally T-shaped cross-section 612, having a central portion 613 and perpendicular portions 614. When the sheet metal box 608 is filled with ballast material, the ballast material is oriented such that the weight of the ballast is biased toward the front end 615 of the frame 601. It should be further appreciated this is an exemplary embodiment, and variations of the ballast where it is biased toward the rear end of the frame or not biased toward either end of the frame are encompassed within this disclosure.

Finally, also visible in FIG. 6 are dowels 616, angled side panels 617 and supports 618. Dowels 616 help align the sheet metal box 608 when installing it and help prevent the sheet metal box 608 from moving laterally or longitudinally in the event of an impact. Angled side panels 617, on the deflection shield attachment members 603 help align the sheet metal box 608 when installing it and help prevent the sheet metal box 608 from moving laterally or longitudinally in the event of an impact. Finally, the supports 618 are supports for the signage 109, and help to align the sheet metal box 608 during installation and help prevent the sheet metal box 608 from moving laterally or longitudinally in the event of an impact.

It will be appreciated by those of ordinary skill in the art that, while the forgoing disclosure has been set forth in connection with particular embodiments and examples, the disclosure is not intended to be necessarily so limited, and that numerous other embodiments, examples, uses, modifications and departures from the embodiments, examples and uses described herein are intended to be encompassed by the claims attached hereto. Various features of the disclosure are set forth in the following claims.

We claim:

1. A towable crash-attenuating vehicle comprising:

a frame having a right side, a left side, a front end and a rear end;

at least two axles coupled to the frame, each of said axles having wheels attached thereto;

a ballast coupled to the frame;

deflection shields coupled to the right and left sides of the frame;

a tow connection coupled to the front of the frame;

an impact attenuator coupled to the rear of the frame;

wherein the vehicle is provided with a brake system.

2. The towable crash-attenuating vehicle of claim 1, wherein the brake system is an air brake system.

3. The towable crash-attenuating vehicle of claim 2, wherein the air brake system locks the brakes when the brake is applied or when pressure is removed from the system and unlocks the brakes when neutral air pressure is supplied to the system.

4. The towable crash-attenuating vehicle of claim 2, wherein the mechanism for locking and unlocking the brake system is an air compressor.

5. The towable crash-attenuating vehicle of claim 1, wherein the brake system is a hydraulic brake system.

6. The towable crash-attenuating vehicle of claim 5, wherein the hydraulic brake system uses hydraulic pressure from a host vehicle to lock the brakes, and has valves to retain the hydraulic pressure in the hydraulic brake system.

7. The towable crash-attenuating vehicle of claim 6, wherein the valves are manually-actuated or electrically-actuated valves.

8. The towable crash-attenuating vehicle of claim 6, wherein the brakes system is unlocked by opening the valves to release the hydraulic pressure in the hydraulic brake system.

9. The towable crash-attenuating vehicle of claim 5, wherein the mechanism for locking and unlocking the brake system is a hydraulic pump.

10. The towable crash-attenuating vehicle of claim 9, wherein the brake system is locked by providing pressure from the hydraulic pump.

11. The towable crash-attenuating vehicle of claim 9, wherein the brake system is unlocked by deactivating the hydraulic pump.

12. The towable crash-attenuating vehicle of claim 1 further comprising on-board warning lights.

13. The towable crash-attenuating vehicle of claim 1 further comprising on-board solar panels to power the on-board mechanism for locking and unlocking the brake system.

14. The towable crash-attenuating vehicle of claim 1 further comprising an on-board generator to power the on-board mechanism for locking and unlocking the brake system.

15. The towable crash-attenuating vehicle of claim 1 further comprising an on-board battery to power the on-board mechanism for locking and unlocking the brake system.

16. The towable crash-attenuating vehicle of claim 1, wherein the deflection shields are comprised of steel plates or hardened aluminum plates.

17. The towable crash-attenuating vehicle of claim 1, wherein the ballast is comprised of a material selected from the group comprising concrete, crushed rock, sand, dirt, water, metallic and/or composite ballast material or other suitable materials of adequate weight.

18. The towable crash-attenuating vehicle of claim 17, wherein the ballast is defined by at sheet metal box for containing the concrete.

19. The towable crash-attenuating vehicle of claim 18, wherein the sheet metal box has lateral and longitudinal stringers for dividing the concrete in the ballast into sections.

20. The towable crash-attenuating vehicle of claim 18, wherein the sheet metal box is further provided with a top cover and drain holes.

* * * * *